Figure 1:
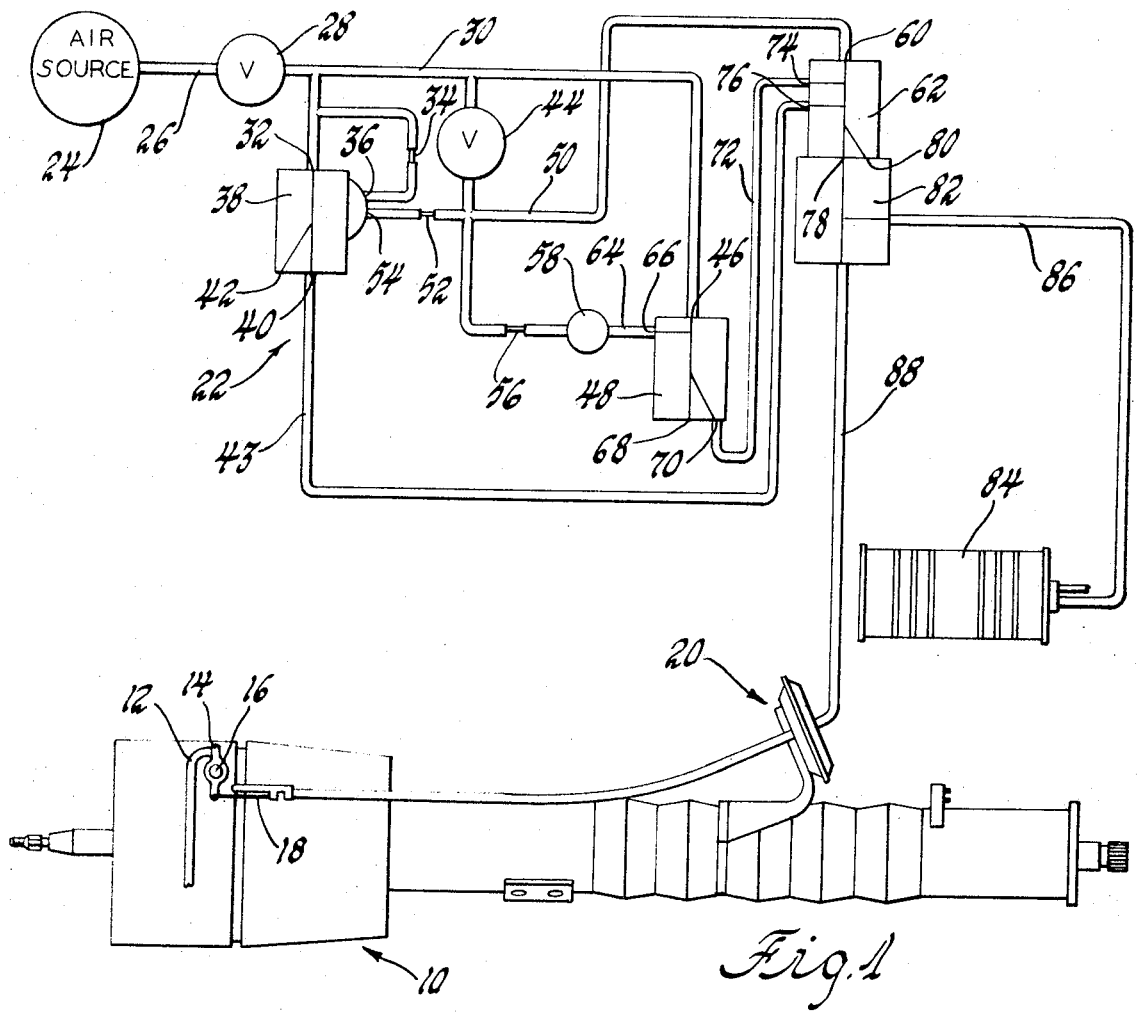

United States Patent

Niedzielski et al.

[11] 3,754,449
[45] Aug. 28, 1973

[54] FLUIDIC CONTROL MECHANISM

[75] Inventors: Donald A. Niedzielski, Bay City; Edgar C. Paffrath, Saaginaw, both of Mich.

[73] Assignee: General Motors Corporation, Detroit, Mich.

[22] Filed: Apr. 1, 1971

[21] Appl. No.: 130,381

[52] U.S. Cl............. 91/35, 91/461, 137/624.18, 137/814, 180/82, 180/112
[51] Int. Cl.............. F15b 13/042, F15b 21/02
[58] Field of Search .............. 91/35, 38, 461, 3; 180/78, 82, 111, 112, 113; 74/493; 137/624.18, 624.2, 81.5, 814

[56] References Cited
UNITED STATES PATENTS

| | | | |
|---|---|---|---|
| 3,508,565 | 4/1970 | Strantz | 137/81.5 |
| 3,536,086 | 10/1970 | Brown | 137/81.5 |
| 3,587,612 | 6/1971 | Creed, Jr. et al. | 137/81.5 |
| 3,078,945 | 2/1963 | Frey | 180/82 |
| 3,170,711 | 2/1965 | Dunifon et al. | 74/493 X |
| 3,199,625 | 8/1965 | Liebreich | 180/78 X |
| 3,216,521 | 11/1965 | Ulrich | 180/78 |
| 3,552,266 | 1/1971 | Tanenblatt | 91/35 |
| 3,605,554 | 9/1971 | Philbrick | 91/38 |
| 3,613,505 | 10/1971 | Bubula | 137/624.18 X |

Primary Examiner—Irwin C. Cohen
Attorney—W. K. Finken, A. M. Heiter and D. F. Scherer

[57] ABSTRACT

A fluidic mechanism for positioning a member to a predetermined position. The mechanism includes a pair of selectively operable control valves which control fluid communication between a fluid source and a plurality of fluidic amplifiers. The output of one fluidic amplifier controls a vacuum control valve such that actuation of both of the selectively operable control valves operates the vacuum control valve to provide fluid communication between a vacuum source and a vacuum motor. The output of the vacuum motor operates to control the positioning of the member.

3 Claims, 2 Drawing Figures

INVENTORS
Donald R. Niedzielski
& Edgar C. Paffrath
BY
Donald F. Scherer
ATTORNEY

FLUIDIC CONTROL MECHANISM

This invention relates to fluidic mechanisms and more particularly to fluidic mechanisms for positioning a member in response to actuation of two control members.

The invention is disclosed in a mechanism for permitting an adjustable steering column, such as that disclosed in U. S. Pat. No. 3,167,971, issued Feb. 2, 1965 to Zeigler et al, to assume the uppermost tilted position. When the operator desires to disembark from the vehicle, he places the transmission control in the park position and opens the operator's door. The park position and the opening of the operator's door operate two control valves which actuate the fluidic control to operate a fluid motor. The fluid motor unlatches the tilt lock on the steering column to permit it to move to the uppermost position. The fluidic control also deactivates the fluid motor, after a time delay, to relatch the steering column in the uppermost position. Upon reentry of the vehicle, the operator may manually select the desired position of the steering column.

While the invention is disclosed in the steering column control mechanism, it will be appreciated by those skilled in the art that the invention is useful in other mechanisms.

It is an object of this invention to provide in an improved fluidic mechanism a plurality of fluidic amplifiers and a fluid motor controlled by a pair of selectively actuatable control valves.

Another object of this invention is to produce in an improved fluid mechanism a pair of selectively operable valves for actuating a plurality of fluidic amplifiers to control the activation of a fluid motor when both control valves are operated and time delay means for deactivating the fluid motor after a predetermined time.

Figure 2:
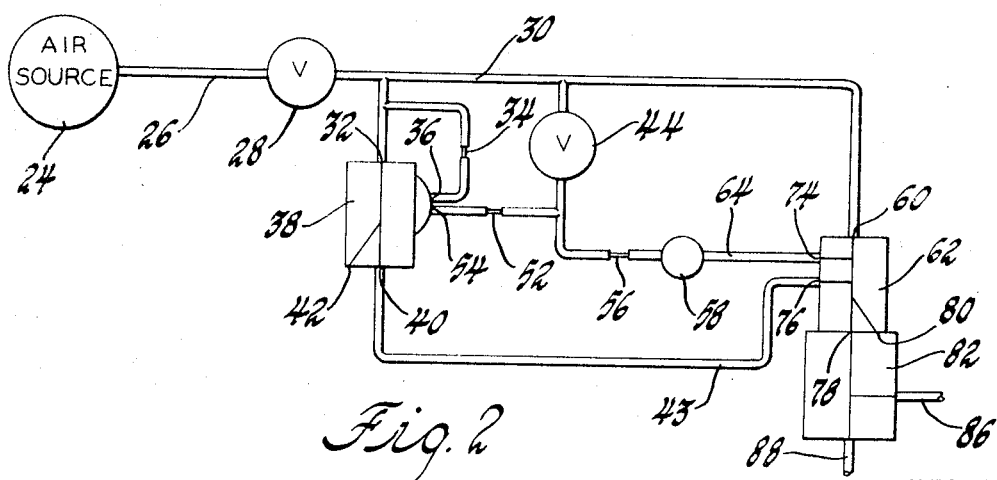

These and other objects and advantages of the present invention will be more apparent from the following description and drawings in which:

FIG. 1 is a diagrammatic representation of a fluidic control and operating mechanism; and FIG. 2 is a modification of the fluidic control shown in FIG. 1.

Referring to the drawings, there is shown in FIG. 1 a tilt type steering column generally designated 10. The steering column 10 is similar in construction to the steering column disclosed in the U.S. Pat. to Zeigler et al No. 3,167,971 which is assigned to the assignee of this application. The steering column 10 has a lever 12 which is pivoted to unlatch the locking mechanism to permit the steering column to be adjusted to the desired position. The lever 12 may be operated manually by the operator or automatically by an unlatching member 14 which is pivotably mounted on a pin 16 and has one portion abutting the lever 12 and another portion connected with a Bowden type cable 18. The cable 18 is secured to a conventional diaphragm type vacuum motor generally designated 20 such that when the vacuum motor 20 is operated the unlatching member 14 is pivoted to move the lever 12 so that the steering column 10 will be positioned in its uppermost tilt position.

The vacuum motor 20 is selectively operable in response to a fluidic control generally designated 22 including an air source 24 which supplies fluid via passage 26 to a conventional two way valve 28. The valve 28 is operatively connected to the vehicle door such that when the vehicle door is closed the valve 28 is closed preventing fluid flow from the air source 24, and when the vehicle door is opened the valve 28 is opened permitting fluid communication from the air source 24 to a control feed passage 30. The control feed passage 30 is in fluid communication with an input port 32 and through a restriction 34 to a control port 36 of a conventional AND/NAND fluid amplifier 38. The amplifier 38 has a pair of output ports 40 and 42. The output port 40 being the preferred or biased output port and the output port 42 being the controlled output port which is vented to atmosphere. The output port 40 is connected with a control passage 43.

The control feed passage 30 is also in fluid communication with a conventional two way valve 44 and an input port 46 of a conventional monostable fluid amplifier 48. The valve 44 is operatively connected to the transmission control lever, not shown, such that when the transmission control lever is in the "park" position the valve 44 is opened to permit fluid communication between the control feed passage 30 and a control passage 50. The control passage 50 is in fluid communication through a restrictor 52 with a control port 54 of the fluid amplifier 38, through a restrictor 56 with a capacitor 58 and with an input port 60 of a conventional OR/NOR fluid amplifier 62.

The capacitor 58 is in fluid communication through a passage 64 with a control port 66 of the fluid amplifier 48. The fluid amplifier 48 is connected in the circuit such that the bias output port 68 is vented to atmosphere and the controlled output port 70 is connected with a control passage 72 which in turn is connected with a control port 74 of the fluid amplifier 62.

The control passage 43 is connected with another control port 76 of the fluid amplifier 62. The fluid amplifier 62 has a biased output port 78 and a controlled output port 80. The biased output port 78 is connected with a conventional air to vacuum interface device 82 such that when the output port 78 is pressurized the interface device 82 is operated to permit fluid communication between a vacuum source 84 via passage 86 through the interface device 82 and passage 88 to the vacuum motor 20. When the output port 80 is pressurized, the fluid communication between the vacuum source 84 and the vacuum motor 20 is discontinued.

During operation when the driver wishes to disembark from the vehicle he will perform two functions. He will place the transmission lever in the park position and open the driver's side door. When the transmission control lever is placed in the park position, the valve 44 is opened providing fluid communication between the valve 28, the power input 60 of fluid amplifier 62, the control input 54 of the fluid amplifier 38 and the capacitor 58. When the driver's door is opened the valve 28 is opened permitting fluid communication from the air source 24 to the valve 44, the power input 32 and control input 36 of the fluid amplifier 38. The amplifier 38 will have control inputs on both control input ports 36 and 54 so that the output of amplifier 38 will be directed to the controlled output port 42. Thus, at this instant there is no control signal for amplifier 62 so that the interface device 82 will be opened to permit fluid communication between the vacuum source 84 and the vacuum motor 20. When the vacuum motor 20 is thus operated the lever 12 of the tilt column 10 will be actuated to permit the steering column to move to its uppermost tilt position.

The restrictor 56 and capacitor 58 perform a time delay function in the circuit such that a control signal is not immediately available at control port 66 of the amplifier 48. However, after a short time delay a control signal will be present at port 66 thereby switching the output of fluid amplifier 48 from port 68 to port 70 so that a control signal is communicated via passage 72 to control port 74 of the amplifier 62. When the control signal is present at control port 74 the output of amplifier 62 will be switched from port 78 to port 80 permitting the interface device 82 to block fluid communication between the vacuum source 84 and the vacuum motor 20 so that the steering column 10 will be relatched in the uppermost tilt position. Upon reentry of the vehicle the operator will manually operate the lever 12 to position the steering column to whatever position he desired.

The control system shown in FIG. 2 is similar to the control system of FIG. 1 such that corresponding components have been given the same numerical designation. In FIG. 2 the power input 60 of the fluid amplifier 62 is in fluid communication with the air source 24 upon the opening of valve 28. However, since the amplifier 38 is in the biased position a control signal is present at control port 76 of amplifir 82 thereby placing the amplifier 82 in its controlled condition to prevent operation of fluid communication between passages 86 and 88. When the control valve 44 is opened a control signal is present at control port 54 of the amplifier 38 so that the amplifier 38 will be switched to its controlled condition thereby eliminating the control signal at port 76 of amplifier 62. Therefore, the power input to the amplifier 62 will be directed to output port 78 to operate the interface device 82 permitting fluid communication between passages 86 and 88 to operate the fluid motor as described for FIG. 1 above. The restrictor 56 and capacitor 58 again function as a time delay means to prevent any fluid communication with the control port 74 of the amplifier 62. However, after a short time delay the control port 74 is pressurized thereby switching the fluid amplifier 62 to the controlled position so that the interface device 82 will prevent communication between the vacuum source 84 of the motor 20 so that the steering column will be relathced in its uppermost tilt position as described above.

Obviously, many modifications and variations are possible in light of the above teachings. It is therefore to be understood that within the scope of the appended claims the invention may be practiced otherwise than as specifically described.

What is claimed is:

1. A fluidic mechanism for positioning a member in a predetermined position in response to the actuation of two control valves, comprising: a fluid source; first fluid amplifier means; second fluid amplifier means having first control means in fluid communication with said first fluid amplifier means and second control means; first control valve means selectively actuatable for providing fluid communication between said source and said first fluid amplifier means; second control valve means selectively actuatable for providing fluid communication between said first control valve means and said second control means of said second fluid amplifier means; time delay means between said second control valve means and said second control means of said second fluid amplifier means for controlling fluid flow time delay therebetween; a vacuum source; a vacuum motor; and valve means in fluid communication with said second fluid amplifier means and being selectively actuatable thereby for controlling fluid communication between said vacuum source and said vacuum motor so that fluid communication is provided initially when both said control valves are actuated and is prevented after the time delay provided by said time delay means.

2. A fluidic mechanism for positioning a member in a predetermind position in response to the actuation of two control valves, comprising: a fluid source; first fluid amplifier means having a power input and biased and controlled power outputs; second fluid amplifier means having a power input, a control input, and biased and controlled power outputs; third fluid amplifier means having a power input, biased and controlled power outputs, a first control input in fluid communication with said biased power output of said first fluid amplifier means and a second control input in fluid communication with said controlled power output of said second fluid amplifier; first control valve means selectively actuatable for providing fluid communication between said source and the power inputs of said first and second fluid amplifier means; second control valve means selectively actuatable for providing fluid communication between said first control valve means and said power input of said third fluid amplifier means, and said control input of said second fluid amplifier means; time delay means between said second control valve means and said control input of said second fluid amplifier means for controlling fluid flow time delay between said controlled power output of said second fluid amplifier means and said second control input of said third fluid amplifier means; a vacuum source; a vacuum motor; and valve means in fluid communication with said biased and controlled power outputs of said third fluid amplifier means and being actuatable thereby when both said control valve means are actuated thereby for providing fluid communication between said vacuum source and said vacuum motor during the time delay controlled by said time delay means and preventing fluid communication between said vacuum source and said vacuum motor after the time delay.

3. A fluidic mechanism for positioning a member in a predetermined position in response to the actuation of two control valves, comprising: a fluid source; AND/NAND fluid amplifier means; monostable fluid amplifier means, OR/NOR fluid amplifier means having a control input in fluid communication with the biased power output of said AND/NAND fluid amplifier means and a control input in fluid communication with the controlled power output of said monostable fluid amplifier means; first control valve means sleectively actuatable for providing fluid communication between said source and the power input and one control input of said AND/NAND fluid amplifier means and the power input of said monostable fluid amplifier means; second control valve means selectively actuatable for providing fluid communication between said first control valve means and the other control input of said AND/NAND fluid amplifier means, the power input of said OR/NOR fluid amplifier means, and the control input of said monostable fluid amplifier means; time delay means between said second control valve means and the control input of said monostable fluid amplifier means for controlling fluid flow time delay therebetween to control the actuation of said monostable fluid amplifier; a vacuum source; a vacuum motor; and valve means in fluid communication with the power outputs of said OR/NOR fluid amplifier being selectively actuatable thereby for controlling fluid communication between said vacuum source and said vacuum motor so that fluid communication is initially provided when both of said control valve means are actuated and prevented after the time delay controlled by said time delay means.

* * * * *